Dec. 12, 1961 E. M. LANGHAM 3,013,195
SERVOMOTOR CONTROL SYSTEM
Filed May 5, 1958 10 Sheets-Sheet 1

INVENTOR

ERIC M. LANGHAM

Imirie & Smiley
Attys.

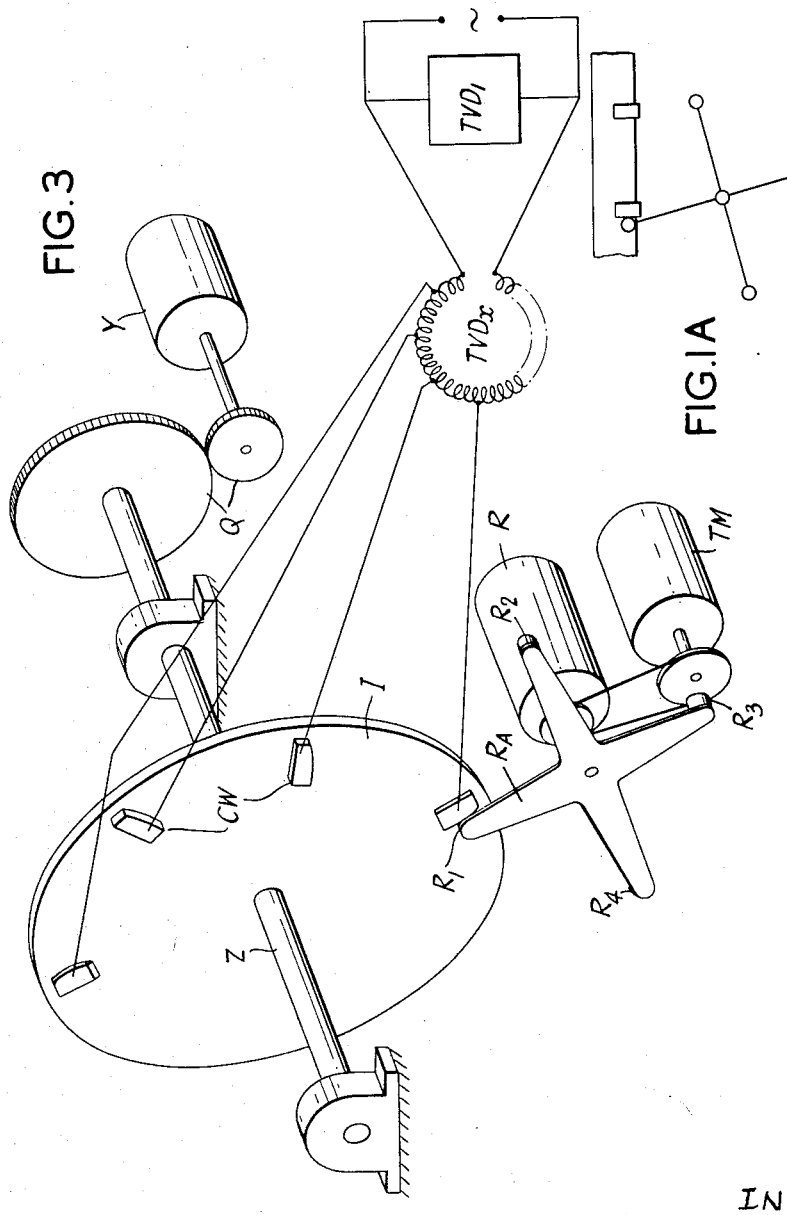

Dec. 12, 1961     E. M. LANGHAM     3,013,195
SERVOMOTOR CONTROL SYSTEM
Filed May 5, 1958     10 Sheets-Sheet 3
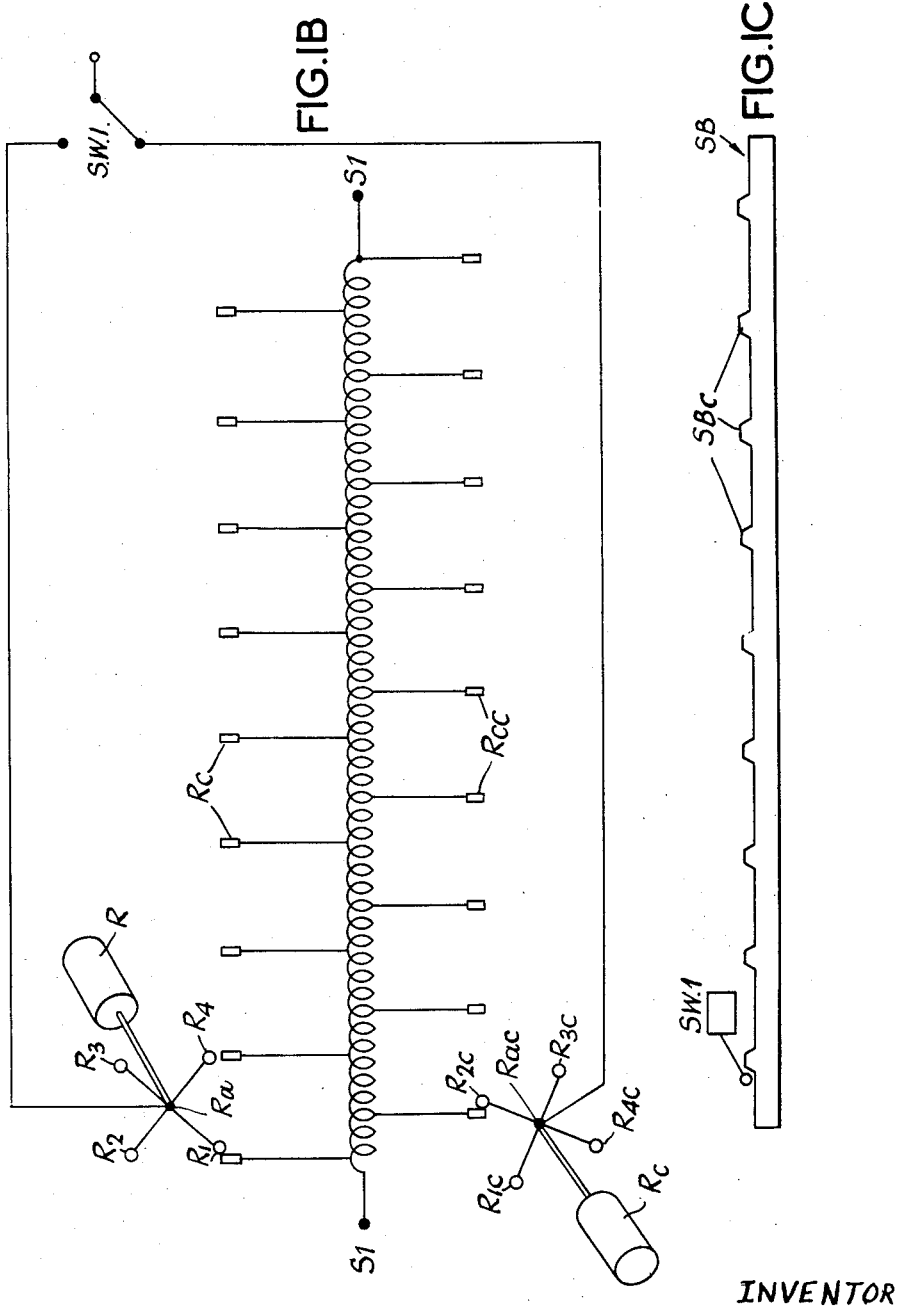
INVENTOR
ERIC M. LANGHAM
Imirie & Smiley
Attys.

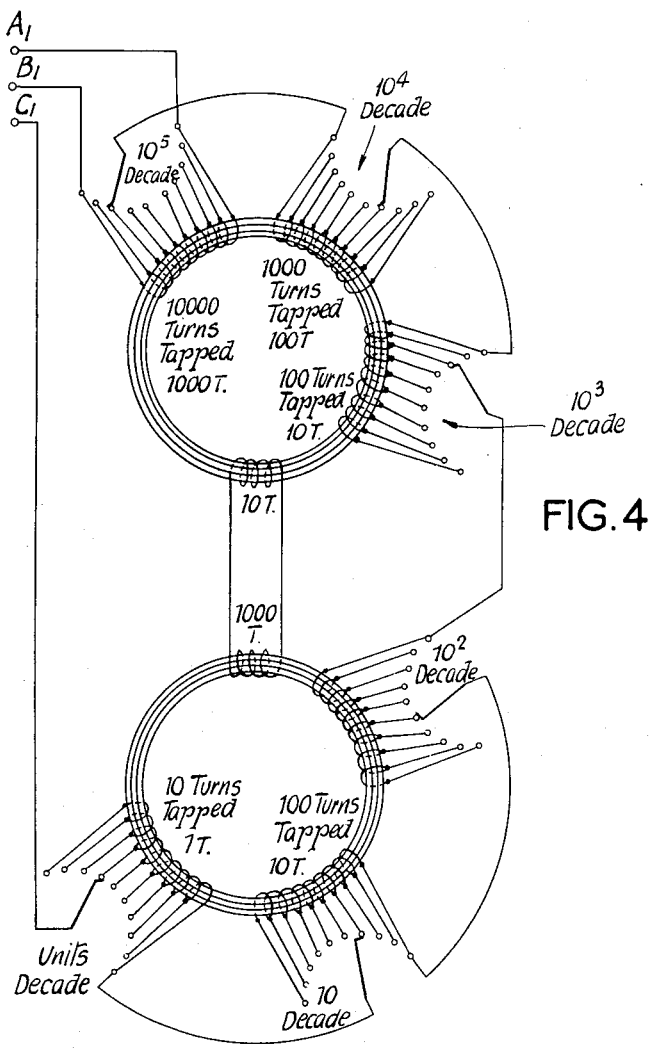

Dec. 12, 1961     E. M. LANGHAM     3,013,195

SERVOMOTOR CONTROL SYSTEM

Filed May 5, 1958     10 Sheets-Sheet 5

INVENTOR

ERIC M. LANGHAM

*Imirie & Smiley*
Attys

INVENTOR

ERIC M. LANGHAM

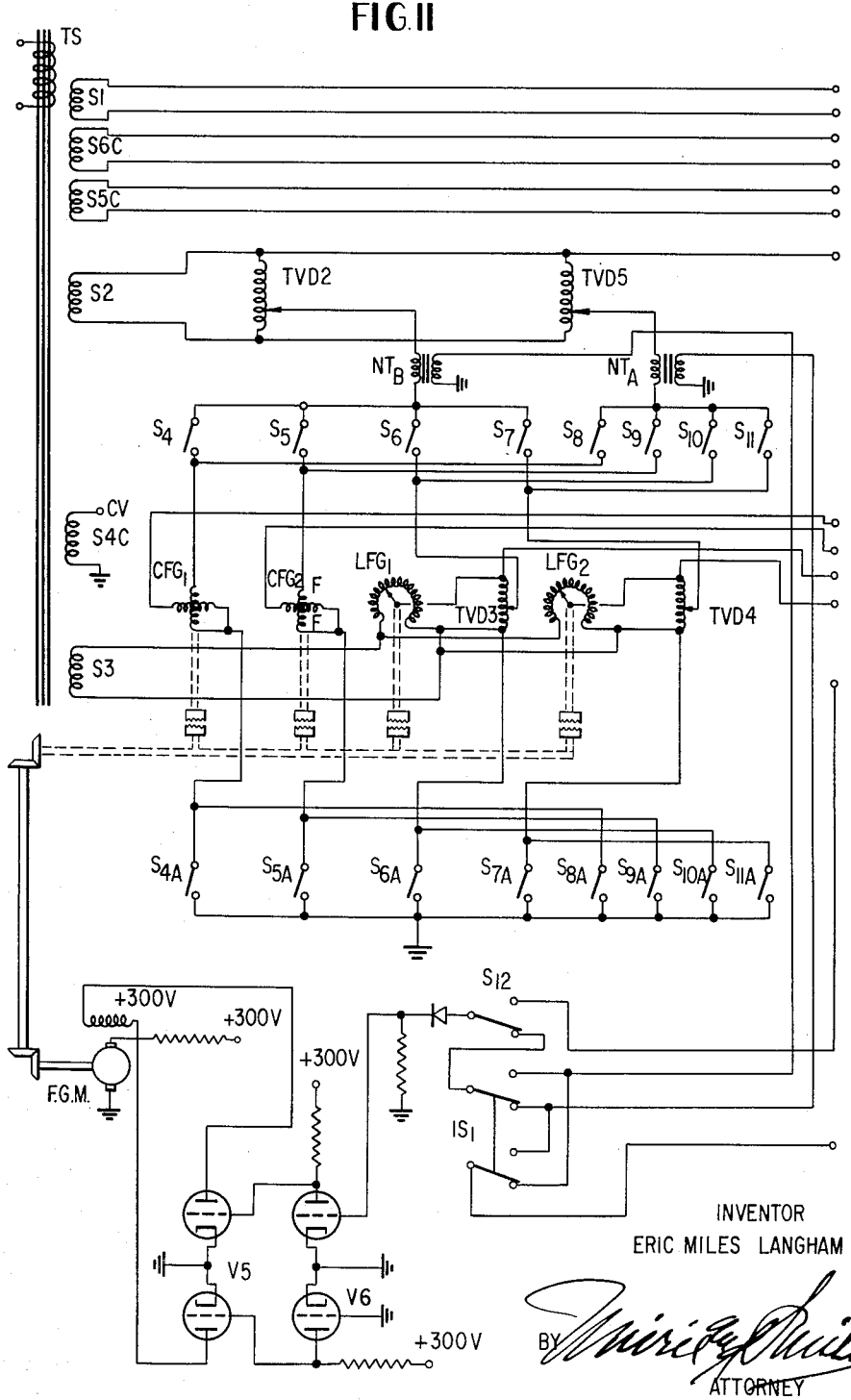

Dec. 12, 1961  E. M. LANGHAM  3,013,195
SERVOMOTOR CONTROL SYSTEM
Filed May 5, 1958  10 Sheets-Sheet 9
FIG.12
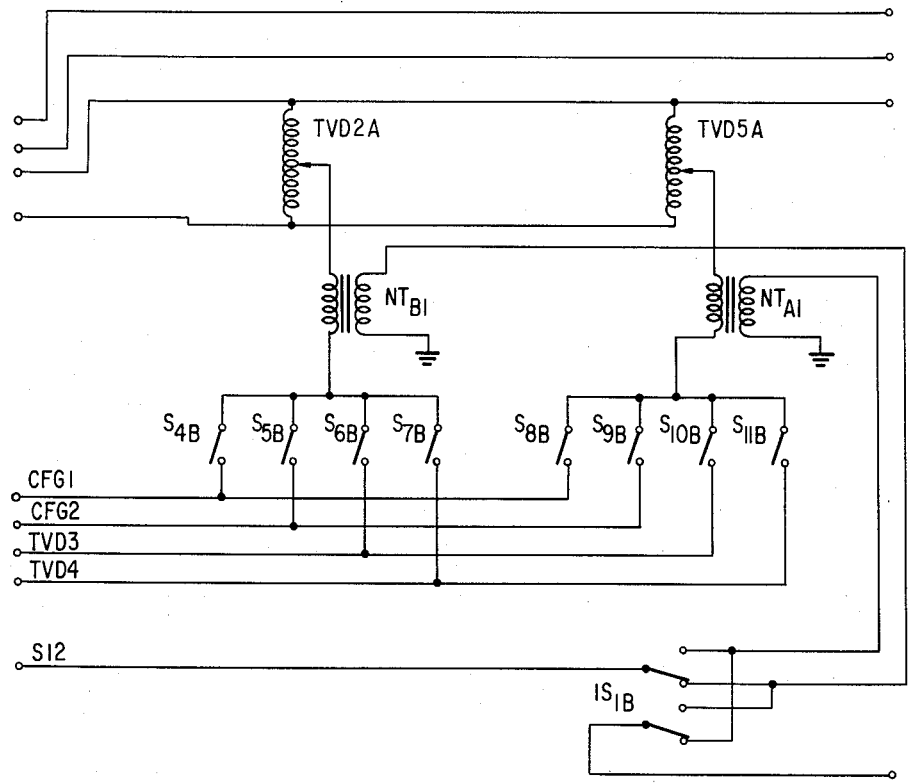
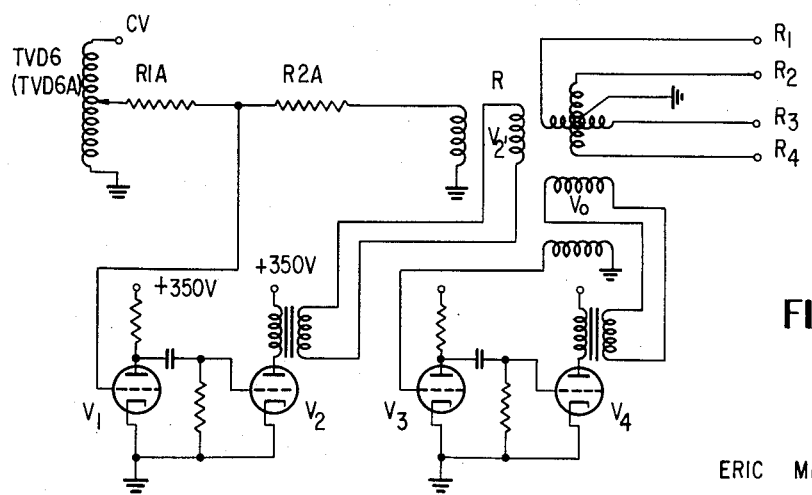
FIG.13
INVENTOR
ERIC MILES LANGHAM
BY
ATTORNEY

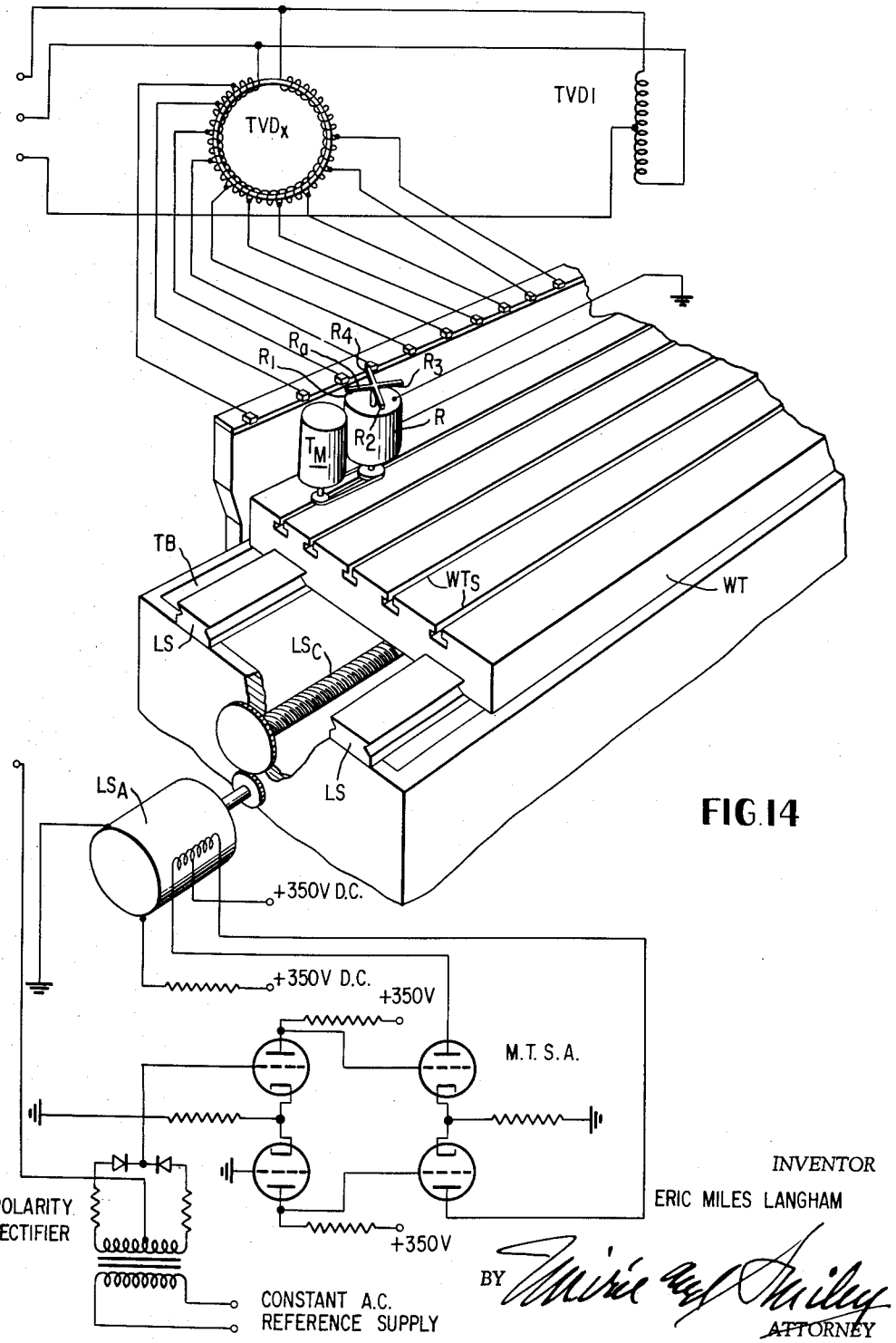

United States Patent Office 3,013,195
Patented Dec. 12, 1961

3,013,195
SERVOMOTOR CONTROL SYSTEM
Eric Miles Langham, 14 The Close, Norfolk,
Norwich, England
Filed May 5, 1958, Ser. No. 733,100
Claims priority, application Great Britain May 6, 1957
24 Claims. (Cl. 318—162)

The invention relates to controlling devices which may be used to control machine tools, inspection devices and automatic drafting machines.

An object of the present invention is to provide a machine tool with means, such as a potentiometer for producing an A.C. reset voltage representing the actual position of the work table, means of comparing this voltage with another voltage representing a desired table position and producing a voltage representing the error, and utilising the error voltage to control a motor influencing the position of the work table until the work table occupies the desired position. The voltage representing the desired position of the table will be termed the command voltage. Continuously varying command voltages are produced by further apparatus according to the invention, in which function generators, capable of generating variations of command voltages appropriate to basic shapes, such as circles or lines are connected additively to further command signals which define a fixed point in relation to the shape generated (such as the centre of a circular arc) to form commands to cause the machine tool to move in a desired contour in relation to the work. Means are provided also for providing a voltage representing a finding ordinate. The finding ordinate represents a point at the end of an element of shape to be cut, and a signal representing the difference between the finding ordinate voltage and the command voltage may be used to indicate when the selected shape has been completed. The end of one element of shape is usually the beginning of the next, so it is convenient to use as a finding ordinate a command voltage representing the beginning of the next succeeding element of shape.

Another object of the invention is to provide similar control systems to the work table motor on the one hand, and to a function generator motor on the other. The function generator motor runs when there is a difference between the reset voltage and the finding ordinate, and the machine tool traverse motor runs when there is a difference between the reset voltage and the command voltage.

A further object of the invention is to provide a re-set voltage of high precision by utilising a transformer or a toroidal voltage divider, which is selectively tapped, the tappings being electrically connected to accurately spaced abutment contacts on the machine bed which are adapted to be sensed by contacts feeding a resolver such as described in the specification of British Patent No. 696,283 whereby a machine tool or work holder may be accurately positioned and controlled to produce or reproduce contours upon a work piece.

For cutting sequential shapes in, for example, sheet metal, the cut to be performed is set onto a first function generator, and its output used as the command voltage and the next cut to be performed is set into a second function generator and used as a finding ordinate. The first function generator is clutched onto a function generator motor until the first cut is complete, at which point the second function generator is clutched into the function generator motor, the inputs to the two motor control systems are interchanged, and the first function generator is clutched out, restored to its reference position, and reset to represent the second next succeeding cut. The function generator motor may be controlled from an auxiliary signal in the interval required to reset the finding ordinate function generator for the second cut, such auxiliary signal being conveniently removed by a time delay relay after re-setting the finding ordinate function generator.

Throughout the following specification and claims the term "function generator" indicates an instrument comprising an input, preferably a mechanical shaft, means for setting the specific properties of a shape, such as the radius of an arc of a circle, means for setting a particular starting point for the shape such as the ordinates between the centre of an arc and the commencement of the arc, and electrical outputs which, upon rotation of the input shaft from a reference position, continually represent the co-ordinate movements of a point tracing out the shape from the selected starting point. When the input shaft is stationary, the outputs represent a fixed point on the function. A function generator provided for a given function is understood in this context to be an instrument capable of generating analogues of any shape conforming to the function defined, that is, circles of any radius, lines of any slope, and the like the particular circle or line required being directly set into the function generator by simple hand or automatic means.

Base ordinates are understood to be the ordinates between convenient reference lines on the work table, and a fixed point related to all shapes produced by a function generator, such as the ordinates between the reference lines and the centre of a circle, or between reference lines and the point on a straight line represented by the output of a straight line function generator whose input shaft is at the reference position.

Ordinates are conveniently referred to in the specification as Cartesian co-ordinates, but Cartesian skew, or polar co-ordinates or combinations thereof may be used as convenient.

According to one aspect of the present invention a machine tool control system comprises a first set and a second set of function generators and base ordinate settings, the electrical outputs from the first set of function generators and base ordinate settings being additively connected through means forming an electric analogue of the co-ordinate movements required to produce a first element of shape on a workpiece, the electrical outputs of the second set of function generators and base ordinates likewise being additively connected through means forming an electrical analogue of the next succeeding element of shape required on the workpiece, the input shaft of a function generator of the first set being rotated at a speed dependent upon the relationship between the selected co-ordinate positions of the selected electrical outputs of the first and a function generator of the second set, whereby the function generator of the first set forms a command for controlling machine tool movements whereby work table movements will cease on reaching a desired position on the work piece or work tool, means being provided for transferring the command to a function generator of the second set, the control drive rotating the function generator of the first set being disconnected and coupled to the function generator of the second set, and means resetting the same or another function generator of the first set for the next succeeding element of shape.

According to a further aspect of the invention, there is provided an apparatus for producing an alternating voltage proportional to the relative linear movement between two members in which one member is provided with electrically conductive abutments along the line of movement, such abutments being electrically insulated from the member and each other and having one face in a plane perpendicular to the direction of relative movement, and each abutment connected to taps on a voltage divider so that it carries a voltage representing to a suitable scale of volts per inch the distance along the line of movement between its reference face and a point in a reference plane perpendicular to the line of relative movement on the other member, a resolver being provided, carrying on its rotating member at least two cylinders or rollers with axes parallel to the axis of such rotating member, means for applying torque to the resolver shaft to press the cylinder successively to successive faces of the abutments when the members are moved relative to each other, such abutments being positioned to permit of such successive contact, each roller or cylinder being electrically conductive and insulated from the others, and connected to a resolver output winding wound on an axis making angles with the other winding axes substantially equal to the angles subtended between the respective rollers and the centre of rotation, the remaining ends of such windings being joined to form a star point which carries a voltage representing, to a suitable scale, the amount of linear movement between the members.

In a preferred form of the invention, base ordinates are produced by means of a toroidal voltage divider supplied with an alternating reference voltage. The toroidal voltage divider is equipped with tapped windings suitable for connection to decade switches, and the tapped windings are series connected so as to produce a voltage ratio between output and input which is proportional to the value set upon the decade switches.

Function generators consist of circuits and instruments such as are used in the electrical analogue computing art, and arranged to have an input shaft, means for setting the specific properties of a shape and means for making settings as outlined in the definition above.

In the accompanying drawings, which illustrate the invention applied to a machine tool:

FIGURE 1A is an enlarged detail of the resolver arm contacts and machine bed contacts;

FIGURE 1B is a somewhat diagrammatic circuit of a modification of the arrangement shown in FIGURE 1;

FIGURE 1C is a detail of switch abutment;

FIGURE 3 is a diagrammatic representation of an alternative means for controlling the resolver;

FIGURE 4 is a circuit diagram of an arrangement of toroidal voltage divider showing selective tappings;

FIGURE 11 is a circuit diagram showing a portion of the contour control circuits;

FIGURE 12 is a circuit diagram showing the balance of the contour control circuit of FIGURE 11;

Figure 1:
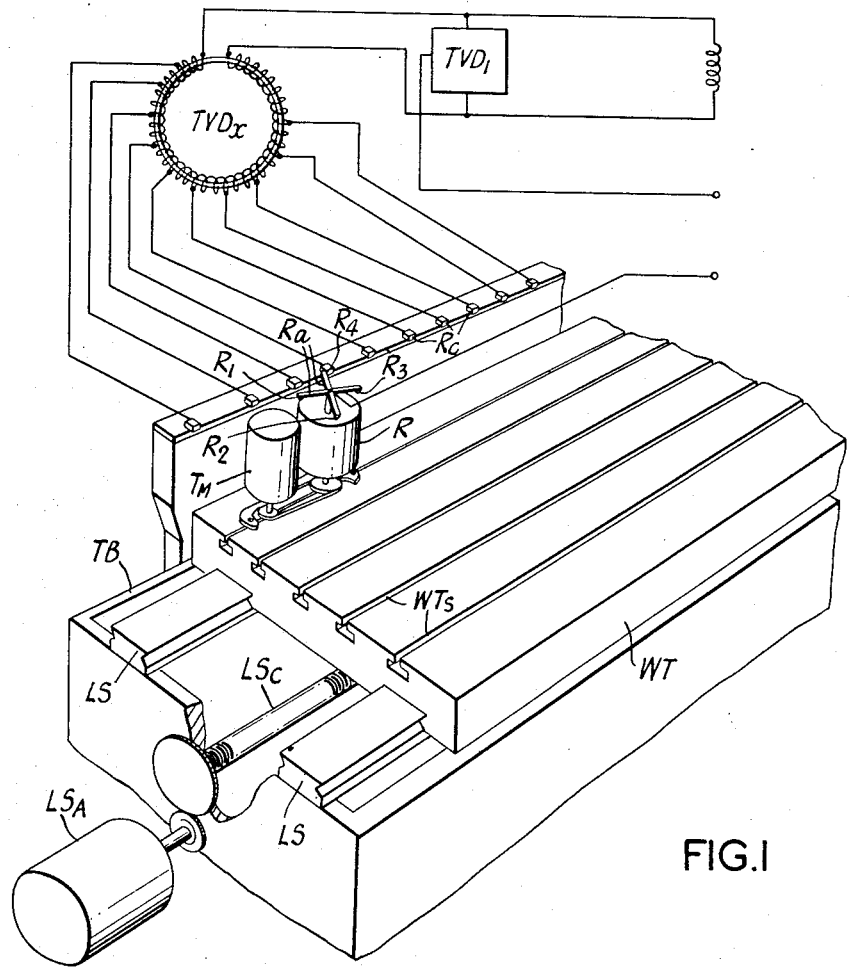
FIGURE 1 is a perspective portion of a general mechanical arrangement of the machine bed and work table.
Figure 2:
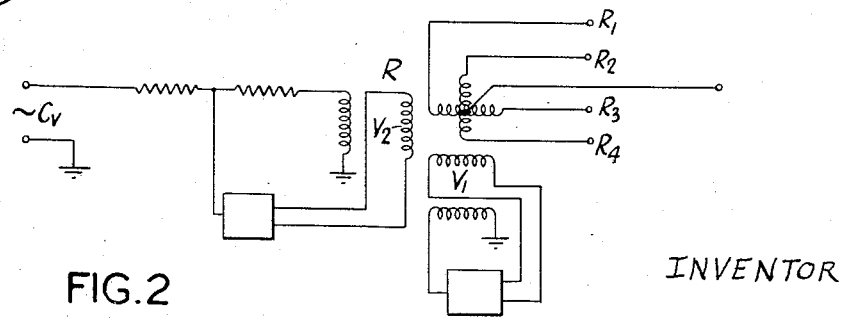
FIGURE 2 is a circuit diagram of the resolver.

FIGURE 13 is a circuit diagram of the resolver similar to that of FIGURE 2 but illustrating in more detail the circuit elements involved; and FIGURE 14 is a perspective view of a portion of the machine bed and worktable similar to FIGURE 1 but adding circuit diagram portions of the lead screw servomotor and other elements appropriately drawn so as to permit reading as a continuation of the circuits diagrammed in FIGURES 11 and 12.

Figure 7:
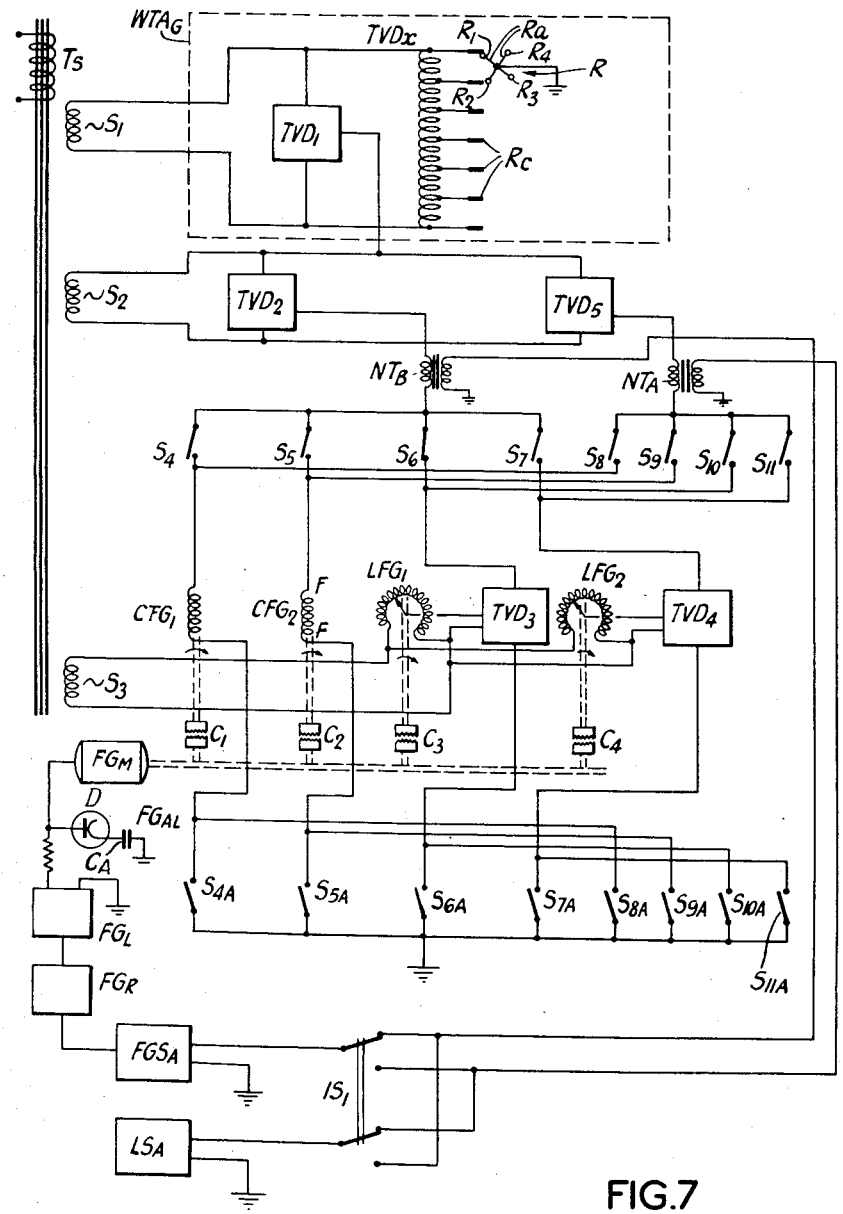
FIGURE 7 is a complete circuit diagram of the machine tool, for obtaining one co-ordinate.

Referring to FIGURE 7, supply voltages S1, S2, S3 are obtained from a multifilar winding of a transformer $T_s$. The supply voltage S1 feeds an electrical circuit arranged so that the output voltage varies by an amount proportional to the movement of the work table, thus producing a reset voltage.

The supply voltage $S_2$ is fed to two toroidal voltage dividers, $TVD_2$ and $TVD_5$, the outputs from which toroidal voltage dividers, representing commands, being connected in series with a work table analogue generator, called for convenience WTAG, to one terminal of nulling transformers $NT_B$ and $NT_A$ respectively. The other terminal of the primary windings of the nulling transformers $NT_A$ and $NT_B$ lead to two banks of switches $S_4$, $S_5$, $S_6$, $S_7$, $S_8$, $S_9$, $S_{10}$, and $S_{11}$, the switches $S_4$ to $S_7$ forming one bank, and the switches $S_8$ to $S_{11}$ comprising the second bank.

The lead from the switch $S_4$ is connected to the lead from the switch $S_8$ and is connected to a circular function generator $CFG_1$, a winding of which is shown in FIGURE 7. The circular function generator will be described in greater detail later on.

The lead from the switch $S_5$ is interconnected with the lead from the switch $S_9$ and is connected to a circular function generator $CFG_2$.

The lead from the switch $S_6$ is interconnected with the lead from the switch $S_{10}$ and is connected to a toroidal voltage divider $TVD_3$.

The lead from the switch $S_7$ is interconnected with the lead from the switch $S_{11}$ and is connected to a toroidal voltage divider $TVD_4$.

The voltage supply $S_3$ is fed to two linear function generators $LFG_1$ and $LFG_2$, hereinafter more fully described, the output from these linear function generators $LFG_1$ and $LFG_2$ being also fed to the toroidal voltage dividers $TVD_3$ and $TVD_4$ respectively.

One end of each of the secondary windings of the nulling transformers $NT_A$ and $NT_B$ is, in this example, earthed to the machine tool bed and the other ends are connected to two interlocked switches, $IS_1$, whereby either nulling transformers $NT_A$ or $NT_B$ can be connected in circuit with a leadscrew servo motor $LS_A$, driving the work table and a function generator servo amplifier $FGS_A$.

Thus whenever there is a voltage in nulling transformers $NT_A$ or $NT_B$, and assuming that the nulling transformer is in circuit through the switch $IS_I$, the leadscrew servo motor $LS_A$ and function generator servo amplifier $FGS_A$ will both operate, and continue to operate until the switch $IS_1$ is opened or the voltage from the secondary winding of the nulling transformer in circuit falls in zero.

The output from the function generator servo amplifier $FGS_A$ is fed to a rectifier $FG_R$ which in turn feeds a voltage limiter $FG_L$, in turn feeding an acceleration limiter $FG_{AL}$, hereinafter described in greater detail, the output from the acceleration limiter $FG_{AL}$, being fed to a function generator a traverse motor $FG_M$ which is mechanically coupled to a series of clutches $C_1$, $C_2$, $C_3$, and $C_4$.

In the foregoing the input to the servo amplifier $FGS_A$ was derived from the difference between a co-ordinate input voltage and a co-ordinate reset voltage. In cutting shapes such as circles it may be more convenient to use as a controlling voltage one of the outputs derived from a circuit such as that described in the specification of British Patent No. 579,338.

In the patent specification there is described a circuit whereby an $x$ and $y$ co-ordinate error voltage may be combined to produce voltages representing errors along and across any chosen vector. If the resolver carrying the diagonally opposed windings is coupled mechanically to the circular function generator resolver one winding of such a resolver will produce a signal representing the extent of the arc required to complete the cut.

Other desirable methods of combining vectors will be obvious to those skilled in the electrical analogue computing art.

Clutch $C_1$ is mechanically connected to the rotor of the function generator $CFG_1$, clutch $C_2$ is mechanically connected to the rotor of the function generator CFG₂, clutch C₃ is mechanically connected to the rotor arm of the function generator LFG₁ and clutch C₄ is mechanically connected to the rotor arm of the function generator LFG₂.

The function generator CFG₁ and CFG₂ and toroidal voltage dividers TVD₃ and TVD₄ can, in this example be earthed through switches $S_{4A}$, $S_{8A}$, $S_{5A}$, $S_{9A}$, $S_{6A}$, $S_{10A}$ and $S_{7A}$, $S_{11A}$ respectively.

Figure 5:
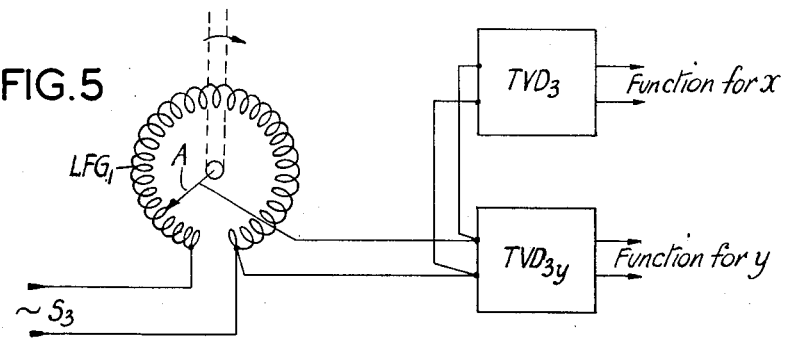
FIGURE 5 is a circuit diagram illustrating a function generator for straight line movements.
Figure 6:
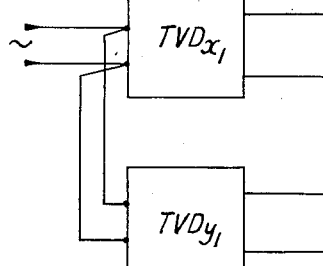
FIGURE 6 is a circuit diagram illustrating a function generator for circular movements.

The function generators for straight line movements and circular movements of the tool for the work table are shown in FIGURES 5 and 6 respectively.

Referring to FIGURE 5, the line function generator LFG₁, is shown, the line function generator LFG₂ is identical in structure.

It will be appreciated that the circuit diagram shown in FIGURE 7 shows only the toroidal voltage divider TVD₃ giving a function for an $x$ co-ordinate, whereas the circuit shown in FIGURE 5 shows two toroidal voltage dividers TVD₃ and TVD₃ᵧ giving functions for both $x$ and $y$ co-ordinates. A further toroidal voltage divider would be provided for $z$ co-ordinates. The direction of the line to be generated is specified by the setting of the toroidal voltage dividers TVD₃ and TVD₃ᵧ.

The linear function generator has a variable ratio transformer LFG₁, such as one known under the registered trademark "Variac." When in the zero voltage position no voltage will flow from either TVD₃ or TVD₃ᵧ. The slider A of the transformer LFG₁ is driven mechanically through the clutch C₃ when engaged by the function generator motor FG_M. Variations of voltage from the transformer LFG₁ are fed to both toroidal voltage dividers TVD₃ and TVD₃ᵧ.

In FIGURE 6 there is shown a circuit of a circular function generator in which a constant voltage is applied to two toroidal voltage dividers TVD_{x1} and TVD_{y1} feeding windings W$x$ and W$y$ respectively of a resolver according to the specification of British Patent No. 696,283, these influence the windings of the rotor of the resolver to give a proportional voltage output $x$ and $y$, when the resolver rotor has a mechanical reference position.

If the rotor is turned from the reference position, the output voltages will vary in such a manner as to be analogous of the Cartesian components of the movement of a cutter describing an arc. The diameter of such an arc will be proportional to $Wx^2 + Wy^2$, the commencement of the arc having a tangent making an angle tan $$\frac{-Wx}{Wy}$$

to co-ordinate direction and the angular extent of the arc will be equal to the angular movement of the resolver rotor.

The winding F.F. shown in FIGURE 6 is shown on the circular generator CFG₂ of FIGURE 7. The remaining details of wiring shown in FIGURE 6 are omitted from FIGURE 7 for the sake of clarity. The winding G.G. occupies a circuit position similar to that for the winding F.F. but for the $y$ co-ordinate.

An example of toroidal voltage divider is shown in FIGURE 4 ilustrating the known method of obtaining the required accuracy of output voltage. The reference voltage is applied to A₁B₁ and the output obtained from C₁A or C₁B₁.

Figure 8:
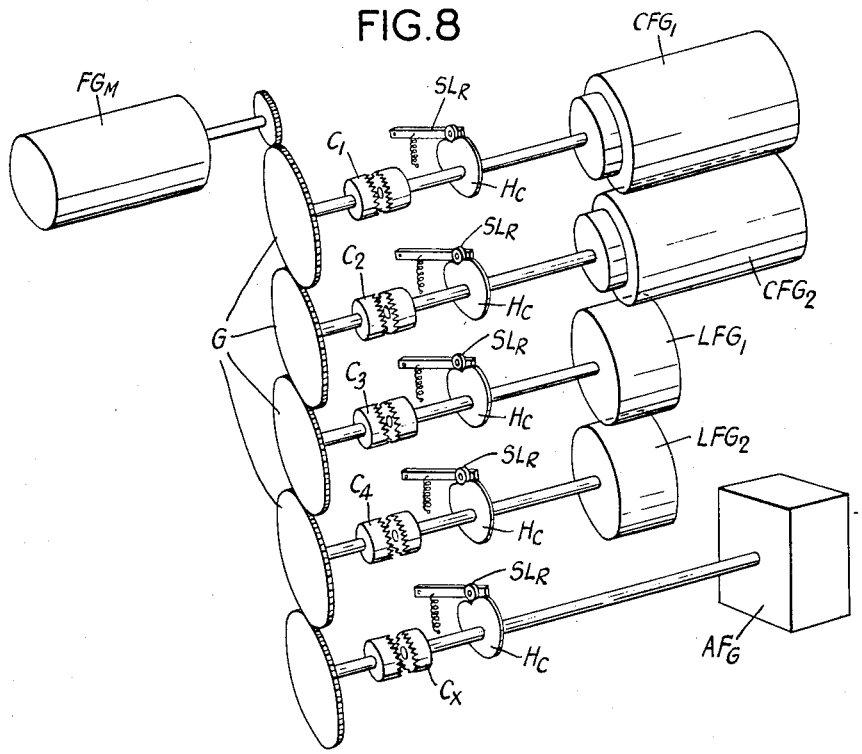
FIGURE 8 is a diagrammatic representation of the driving arrangement for the function generator.

The function generator driving arrangement is shown in greater detail in FIGURE 8 in which the function generator driving motor FG_M is geared to a gear train G driving clutches C₁ to C₄ and C_x which clutches can be selectively engaged to transfer the drive from the function generator driving motor FG_M to either circular function generator CFG₁ or CFG₂ or either linear function generator LFG₁ or LFG₂ or combination thereof. Heart shaped cams Hc are provided on each function generator shaft so that the function generators can be restored to a datum position by the spring loaded rollers SLR.

An alternative function generator AF_G is provided, for instance, for copy milling or other especial function. In the instance of a copy miller, information being fed to the alternative function generator AF_G from a stylus moving over a master, and operating work table analogue generators and/or work rotating analogue generators through appropriate mechanism. The scale of copying may be adjusted in any co-ordinate by interposing a toroidal voltage divider between the work table analogue generator or work rotating analogue generator and the terminals of the function generator amplifier.

To those skilled in the art of electrical analogue computing it will be obvious that function generators are not restricted to the examples cited above, and that all of the techniques applied to electrical analogue computing circuits can be used as function generators.

In the example described above the base ordinates were set on TVD₂ or TVD₅ so as to produce an electrical analogue of the command voltage but the additive connection of base ordinate and function generator may alternatively be achieved by arranging that the device producing the reset voltage is capable of adjustment along the direction of travel of the machine tool so as to produce a reset voltage proportional to the displacement of the machine tool bed in relation to an adjustable point, this latter adjustable point being set for instance by means of a lead screw to a value corresponding to the base ordinate. Two such adjustable reset voltages may be produced and arranged to measure the travel of the work table in relation to the point which would otherwise have been set on TVD₂ or TVD₅ respectively. Such reset voltages could be connected in place of the outputs of TVD₂ and TVD₅ respectively and then the programme control could take place as described for the circuit arranged as FIGURE 7 but adjusting the two lead screws instead of the two toroidal voltage dividers. By this arrangement any of the well known table positioning devices may be used to set the lead screws to the base ordinates and the analogue device according to the patent used for generating functions centered on the base ordinates.

The toroidal voltage divider shown on FIGURE 4 is drawn as would be for the hand setting of the toroidal voltage divider ratio. Hand settings may be used in some embodiments of the invention or alternatively apparatus converting punched holes in tape to decimal representation of numbers can be used to set the ratio of the TVD according to known art.

Figure 10:
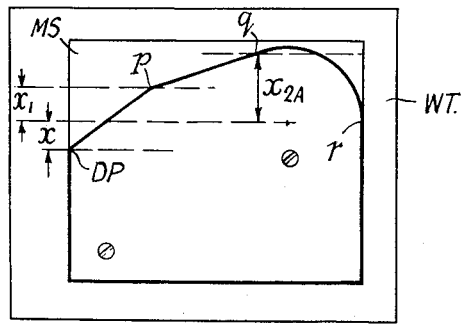
FIGURE 10 is an example of work piece showing the shape to be cut by an appropriate tool.

As an example of one operation of the machine, it will be assumed that it is required to cut a plate to a shape such as is shown in heavy lines FIGURE 10, from a rectangular metal plate MS which is clamped to the work table WT.

A datum point DP is selected as a starting point.

The ordinate of the commencement of the first part of the programme is fed into the toroidal voltage divider TVD₅ by a tape or is manually set. Since the commencing operation consists of a straight line cut, a linear function generator is selected, for example LFG₂, by closing relays S₁₁ and S₁₁A. Since the operation is to be commenced at the datum point, DP the toroidal voltage divider TVD₅ is set to zero output.

The lead screw servo motor LS_A operates when the voltage nulling transformer NT_A is not zero, so the lead screw servo motor LS_A moves the work table, hence adjusting the work table analogue generator to maintain the voltage between the output of the toroidal voltage divider TVD₁ and the earth point of the resolver R, in this instance, at zero. Manual adjustment of the toroidal voltage divider TVD₁ will cause the work table to move in sympathy, and such manual adjustment is carried out until the tool is at the required datum point DP on the work piece MS.

It will be appreciated that once the machine tool has been set at the datum point DP the first operation will comprise cutting a straight line DP to $p$, and that the second operation will comprise cutting a straight line from $p$ to $q$. The third operation will comprise cutting a circular path from $q$ to $r$, and so on round the required shape.

The data defining the end of the first operation and defining the start of the second operation is fed by tape, or stud switches, through relays controlling the toroidal voltage divider $TVD_2$.

Since the second operation, cutting from $p$ to $q$ is also a straight line function the second straight line function generator $LFG_1$ is selected by closing the relay switches $S_6$, $S_{6A}$. The data representing the direction of the line comprising the second operation is set in similar manner on the toroidal voltage divider $TVD_3$ and the corresponding toroidal voltage dividers $TVD_{3y}$ for the $y$ co-ordinate.

Under these conditions the nulling transformer $NT_A$ is driving the lead screw servo motor $LS_A$ so that the work table position corresponds to the command contained in the toroidal voltage dividers $TVD_5$ and $TVD_4$. The nulling transformer $NT_B$ carries a voltage representing the co-ordinate distance between the present position of the machine tool and the position it will hold when the present operation is completed.

The programming tape now operates relays to set the traversing speed and to commence the cut. These relays will close the clutch to the selected function generator, in this particular instance, clutch $C_4$, start the function generator motor $FG_M$ smoothly so that the linear function generator $LFG_1$ produces a voltage, which in conjunction with the toroidal voltage divider $TVD_4$ causes the work table to move in the required direction at a speed limited by the setting of the function generation speed limiter $FG_L$, provided that the output voltage of the nulling transformer $NT_B$ is sufficient to operate the function generator limiter $FG_L$. As the work table moves the work piece near the end position of the first operation, the output voltage from the nulling transformer $NT_B$ decreases until ultimately the traversing motor $LS_A$ stops when the output voltage from the nulling transformer $NT_B$ falls to zero. Under these conditions both the function generator motor $FG_M$ and lead screw servo motor $LS_A$ are stopped, whence they are automatically switched off and locked.

It will be appreciated that FIGURE 7 shows the control for the $x$ co-ordinate only. Since the function generator must complete all co-ordinate movements, the function generator servo amplifier and function generator rectifier are multiplicated for each operative movement, and the output of the function generator rectifiers are added electrically before passing to the function generator limiter.

The interlocked switches $IS_1$ are then reversed so that the second programmed operation will operate the lead screw servo motor $LS_A$. The relay switches $S_{11}$ and $S_{11A}$ which were set for the first operation are now opened and the clutch $C_4$ is disengaged. At the same time the toroidal divider $TVD_4$ may be reset for another programme.

The end of the second operation is defined by the ordinate $x_2$, to the centre of that circle of which the arc $q$, $r$ forms a part, FIGURE 10 and the ordinate $x2a$ from the centre of this circle to the starting point of the tool cut.

To effect this accurate cut a circular function generator is selected, for example, the circular function generator $CFG_2$ by closing the switch relays $S_5$, $S_{5A}$. This will prepare the winding F.F. for the generation of the $z$ ordinate. The other winding G.G. of the circular function generator CFG FIGURE 6 will likewise be switched into circuit for the $y$ ordinate.

The toroidal voltage divider $TVD_x$ is set, as is also its counterpart for the $y$ ordinate, so that the winding F.F. gives a voltage proportional to $X_{2A}$. See FIGURES 6 and 7.

Figure 9:
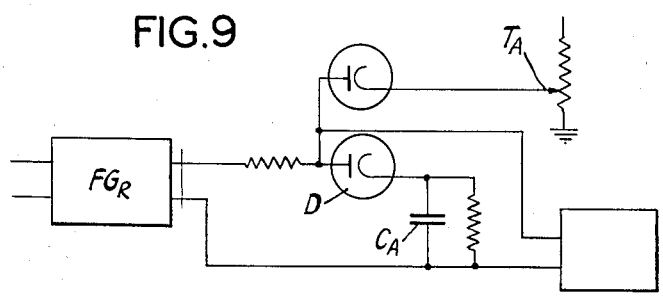
FIGURE 9 is a circuit diagram of a function generator speed controlling device.

The toroidal voltage divider $TVD_2$ is then set to the ordinate $x_2$ and the work table traverse speed is also set by the arm TA, FIGURE 9. The clutch $C_3$ is engaged and all the servo motors are brought into operation.

As soon as an operation is commenced, it will be appreciated that a large voltage surge will be experienced by the function generator motor due to the difference between the datum point at which the operation commenced and the point programmed for ultimate arrival of the tool. To control this voltage surge a diode D is connected in series with a capacitor CA in a circuit to control the acceleration of the motor $FG_M$, FIGURE 7.

The aforesaid procedures are repeated until all the operations are complete.

Thus the programming of the machine is always one step ahead of the actual operation stage being performed by the machine tool, and in the example given the position of the completion of one operation is the position of commencement of the next operation. It will also be appreciated that in the example given, a programme may be set on the toroidal voltage divider $TVD_2$ while the toroidal voltage divider $TVD_5$ is still operating, at the completion of which operation the toroidal voltage divider $TVD_5$ is switched out of circuit and cleared ready for the next programme, as the toroidal voltage divider $TVD_2$ is switched into circuit.

It will be understood by those skilled in the art that the co-ordinate control consists in controlling the work table analogue generator or work rotation analogue generator so that the sum of a number of voltages produced by different settings or devices tends to zero. Accordingly adding voltages or currents by any known means used in analogue computer design may be used instead of the series connections shown in examples described.

Although not specifically stated above, a work table analogue generator or work rotating analogue generator may be mechanically coupled to the tool rotating or reciprocatory drive and used in conjunction with resolvers or toroidal voltage dividers to form a function generator. This feature may be used for gear cutting where hobs are preferred as the cutting tool. Likewise in a lathe a work table analogue generator or work rotating analogue generator may be coupled directly or through gears, or through a lead screw and nut or equivalent to the lathe headstock to form a function generator suitable for thread cutting and the like. In such an event it may also be convenient to control the cutter or headstock motor in like manner to the control for the function generator motor $FG_M$ and to provide recentering devices and clutches.

It should be understood that either the work table or the machine tool itself can be controlled by the controlling circuits hereinbefore described, that is to say, the worktable may move relatively to the tool or the tool relatively to the work table.

The work table analogue generator will now be described in greater detail with reference to FIGURE 7 in which the supply voltage $S_1$ feeds a toroidal voltage divider $TVD_x$, and also a toroidal voltage divider $TVD_1$. The toroidal voltage divider $TVD_x$ is tapped the tappings being electrically connected to contacts RC which are accurately positioned on, but electrically insulated from, the bed of the machine tool. The contacts RC are more clearly shown in FIGURE 1 and are more fully described hereinafter. The electrical contacts may of course, be made by auxiliary relays instead of by the contacts RC.

The abutments RC, resolver R and toroidal voltage dividers $TVD_x$ and $TVD_1$ comprise a work table analogue generator, generally designated WTAG.

A resolver R, is mounted on the work table or the machine as hereinafter described. The resolver R has cross arms $Ra$ mechanically connected to the rotor. The cross arms $Ra$ have circular contacts $R_1$, $R_2$, $R_3$ and $R_4$ which abut against the contacts RC as the work table moves relatively to the machine bed and the arms $Ra$ are rotated.

Contacts $R_1$ to $R_4$ preferably have their centres accurately positioned on the corners of a square whose side is equal in length to the spacing of the contacts RC.

It will be appreciated that more or less than four arms $Ra$ may be provided on the resolver R.

The centre point of the output windings of the resolver R is, in this example, earthed onto the machine bed.

The rotor of the resolver R moves through an angle whose sine is equal to the ratio of two lengths, one of which is the radius of the circle including the centres of the contacts $R_1$ to $R_4$, and the other is the component distance between the face of an abutment RC in contact with one of the contacts $R_1$ to $R_4$ and the centre of rotation of the rotor of the resolver R. The voltage generated between the contact above mentioned and the junction point of the windings is also accurately proportional to the sine of the said angle, hence the resolver output represents the component distance between the centre of the resolver and the face of the abutment in contact with the contacts $R_1$ to $R_4$. The resolver output is operatively connected in series with the voltage generated at the abutment RC. The scale of the resolver output is arranged so that when two contacts ($R_1$ to $R_4$) are in contact with two abutment RC, E.M.F. balance is obtained. Accordingly the voltage between the resolver junction point and one end of the toroidal voltage divider $TVD_x$ represents to a suitable scale the distance between the end abutment face and the centre of rotation of the resolver R.

Referring particularly to FIGURE 1 which illustrates the means whereby the resolver R is operated, the machine tool bed TB has longitudinal slides LS on which is mounted a worktable WT, which has slides $WT_S$ for securing a work piece in a known manner. The work table WT is moved longitudinally by a lead screw $LS_C$ which is rotated by the lead screw servo motor $LS_A$. It will be appreciated that although not shown a similar arrangement is provided to produce lateral movements.

Control of the longitudinal and lateral movements of the work table are well known in the art and any known means for producing such movements by means of servo motors may be employed.

Accurately positioned on the machine bed, but electrically insulated therefrom are the contacts RC which are hard faced and electrically conductive. Connected to the contacts RC are tapping leads from the toroidal voltage divider $TVD_x$.

Sensing the contacts RC are the rollers, $R_1$, $R_2$, $R_3$ and $R_4$ which are mounted on the cross arms $Ra$, resolver rotor windings, not shown, driven by the cross arms constitute a four phase system, the voltages across the arms, at the ends of which are $R_1$, $R_3$, or $R_2$, $R_4$ are respectively equal but opposite in sign.

The circuit of the resolver R is shown in FIGURE 2, and is fed from a datum transformer supplying a constant voltage $C_V$. The resolver is substantially identical with that described in the specification of British Patent No. 696,283 and is not therefore described in full detail. More information may however be gleaned from the diagram of FIGURE 13 in which resistances R1A and R2A form a comparator network, so that the output voltage from the resolver winding connected to R2A provides heavy degenerative feedback to the amplifier comprising valves V1 and V2. The amplifier is of high gain so that the amplifier output controls voltage V2' so that the voltage at the feedback winding is very accurately proportional to the voltage applied by the toroidal voltage divider to R1A.

The other amplifier comprising valves V3 and V4 are connected in a manner similar to the amplifier comprising valves V1 and V2, but in this case the amplifier output Vo is controlled so that the output from the feedback winding is zero.

Thus, the flux in the resolver is controlled accurately to a known value in the axis controlled by amplifier (V1, V2) and accurately to zero in the axis controlled by (V2, V4). These axes are mutually perpendicular.

If now the voltage between R2R4 on the resolver rotor output is measured, the position of the resolver rotor may be adjusted until this voltage is zero. Under these conditions, the output from winding R1R3 will have a maximum value. If this position is chosen as a datum, then for all fixed rotor angles the voltage from R2R4 will vary as a sine of the angular position of the rotor, with reference to the datum angle, and the voltage from R1R3 will vary as the cosine. The maximum voltage obtained from these windings will be proportional to the setting of TVD6. Accordingly, if the rotor is continuously rotated, the output voltages from R1R3 and R2R4 respectively, will represent the cartesian co-ordinates of a point moving in the circle of a radius proportional to the setting of the ratio of TVD6, hence the name "circular function generator."

To ensure that the rollers $R_1$ to $R_4$ on the arms $Ra$ are successively pressed into firm contact with the contacts RC a tensioning motor $T_M$ is provided, which motor is constantly driven being stalled when one of the rollers is firmly abutting against a contact.

If FIGURES 11, 12 and 14 are placed side by side with the respective wires in alignment, the control system for the Y axis can be followed. Likewise, if FIGURES 11 and 14 are placed side by side with the wires in conjunction, the control system for the X axis may be followed. Thus, FIGURE 14 relates either to the X axis or to the Y axis according to whether it is read in conjunction with FIGURE 11 or in conjunction with FIGURE 12 and FIGURE 11.

Considering first the X axis and referring to FIGURES 11 and 14 placed side by side.

TS is a reference transformer equipped with multifilar windings so that the voltages at the secondaries have accurate transformation ratios between them. Secondary S1 energises TVD1 and TVDX is parallel. Secondary S2 energises TVD2 and TVD5 in parallel. Secondary S3 energises the linear function generators LFG1 and LFG2. Secondary S4 has one terminal earthed and the other terminal provides a constant voltage for energising the resolver circuits as shown on FIGURE 13.

CFG1 and CFG2 on FIGURE 11 are the rotor circuits of two circular function generators. These circular function generators are resolvers whose stator circuits are each energised in the manner shown in FIGURE 13. Referring to FIGURE 13, a constant reference voltage CV from secondary S4 of transformer TS is applied to a toroidal voltage divider TVD6. The ratio of this toroidal voltage divider is set either by hand or by tape reading equipment to a ratio representing the radius of a circle to be generated.

In FIGURE 13, the two centre tapped rotor windings are shown with the centre point connected together and earthed. The rotor connection is used for the measurement of length by resolver R in FIGURE 14, but for circular function generators, the centre points are not connected together, but one end of each winding is connected together to provide a single ended output for the sine and cosine voltages as shown in FIGURE 11. Hence rotation of the rotors of CFG1 or CFG2 produce voltages at the rotor windings which represent the X and Y co-ordinate movement, respectively, or a point moving in a circle of radius represented by the setting of TVD6.

Secondary S3 energises two linear function generators LFG1 and LFG2. The linear function generator consists of a continuously variable transformer, such as that known under the trade name of "Variac," whose input is energised at a constant voltage from S3 and whose variable output is used to energise a toroidal voltage divider TVD3 in FIGURE 11. If the rotor arm of LFG1 is set to zero and moved continuously in such a direction as to increase the output voltage from LFG1, the voltage at the input to TVD3 will increase at a rate of $$\frac{1}{K}$$

times as fast as the voltage at the output of TVD3 where K is the ratio of TVD3 as set by hand or card reading equipment. If voltages are taken to represent the cartesian co-ordinate of a point, the point will trace a straight line moving at an angle whose tangent is K with relation to an axis represented by the movement assigned to the voltage at the input to TVD3.

A straight line at any angle to the axis up to 45° can be represented by setting TVD3 to an appropriate ratio between zero and unity. Reversal of the output of TVD3 extends the range from plus unity to minus unity.

If the wires leading away from TVD3 to S6 and to FIGURE 12 are interchanged the axis of reference is interchanged so that lines in any direction can be generated.

With reference to FIGURE 11, the circuit to generate a circle will be described. First a circle function generator is selected through CFG1 by closing switch S4. Following the circuit from earth on the lower pole of S4A, the wire is connected in series with one rotor output of CFG1, then is connected to S4; through the primary of nulling transformer NTB; and then to the tap of TVD2. From the top of TVD2 a wire is taken to TVD1 on FIGURE 14. The output of TVD1 is added, by series connection, and then the output from the tap of TVDX which is in contact with resolver cross arm contact R4. From resolver cross arm contact R4, the output of resolver rotor R phase 4 is added to the circuit by series connection, and the circuit returns to earth.

On TVD2 is set a ratio representing the position of the centre of the desired circle with relation to a datum point on the work.

TVD1 is set by the machine tool operator so that its output represents the distance between the end of the machine tool travel, and a point which he has selected as a datum point on the work. The output from TVDX represents the distance between the end of the machine tool travel and the abutment contact touching resolver rotor arm R4, and the output from resolver winding number 4 represents the distance between the centre of rotation of the rotor of resolver R and the abutment R4.

For ease of explanation, assume initially that the ratio of TVD6 is zero representing a circle of zero radius, i.e. a point. Assume also that the operator has set upon TVD1 the distance between the end of the machine tool travel and a datum point on the work piece, and upon TVD2 the distance between the centre of the circle and a datum point on the work. If the machine tool bed occupies this position in the X axis, the voltage at the primary of nulling transformer NTB will be zero, which can be deduced by careful analysis of the voltages added in the circuit. If the machine tool position in the X axis is not in accordance with the setting of TV2, there will be an error voltage on the primary of NTB, and this error voltage will induce on to the secondary of NTB a corresponding voltage which is connected via switch 1S1 to the polarised rectifier shown which converts the alternating voltage from NTB into a D.C. voltage proportional in magnitude and direction to the voltage at NTB, and thence to the machine tool servo amplifier MTSA, FIGURE 14, which amplifies this voltage and controls the field of lead screw motor LSA. MTSA and LSA comprise a splitfield motor/servo amplifier system whose operation is well known to those skilled in the art. Accordingly, if there is a voltage at the primary of NTB, motor LSA will drive the machine tool bed in the X co-ordinate until the voltage at NTB vanishes, in other words, motor LSA will control the machine tool bed in the X direction so that its position with rela- tion a datum point on the work corresponds to the setting of TVD2.

Now assume that the reference position for the rotor of CFG1 is such that the output of the winding connected to S4C is at a maximum and the other winding has zero output. Now if TVD6 is removed from zero output position to finite output, the output from the rotor winding of CFG1 connected to switch S4 will change from zero to a finite value, and will generate a voltage in NTB, which will cause motor LSA to drive the machine tool X co-ordinate to a new position. This new position will have a distance from the original position represented by the radius set upon TVD6.

If the clutch associated with CFG1 is now closed, and motor FGM started, the voltage from CFG1 rotor will vary according to a cosine law and cause a corresponding motion in the X axis of the machine tool movement.

If FIGURES 11, 12 and 14 are placed in line from left to right with the respective wires in line, FIGURE 14 can now be taken to represent the Y axis of the machine tool. Following the circuit for the Y axis from switch S4A, the connections are to a rotor winding of CFG1, and thence to switch S4B which is closed, then to NTB1 primary, then to TVD2A, then to TVD1 and TVDX and R back to earth, in a manner similar to the X axis.

For this portion of the description TVD1 is assumed to be set by the machine tool operator to the distance between the end of the Y travel of the machine tool, and a datum point on the Y axis of the work.

TVD2A is set to the Y co-ordinate of the centre of a circle to be cut in the work, and the voltage between the end of TVDX and the star point of the rotor now represents the distance between the end of the travel of the Y axis of the machine, and the centre of rotation of the resolver R. It will be clear that for the Y axis rotation of CFG1 will cause the work table to move with a sine law function about a point of the Y axis representing the centre of a circle.

Therefore, if both X and Y movements are considered together, we have the cutting tool describing a cosine law in the X axis and a sine law in the Y axis, which when combined, form a circular motion whose radius is proportional to the setting of TVD6. For the Y axis, the output of NTB1 is taken through switch 1S1B to MTSA which, when taken in conjunction with FIGURE 12 represents the Y axis movement of the machine tool.

If the settings of TVD2 and TVD2A remain as for the circle described above, and switch S4 is opened, and switch S6 is closed, it will be seen that instead of sinusoidal variations of voltage a linear variation of voltage is obtained from LFG1 when the clutch associated with LFT1 is closed and with motor FGM driven. The slider of TVD3 controls the movement of the machine tool in the X axis, whereas the input of TVD3 controls through switch S6B and NTB1 the movement of the machine in the Y axis; consequently for a given velocity applied to LFG1, the ratio of speeds of the X and Y axis of the machine tool is controlled by the ratio of TVD3. The Y axis runs faster than the X axis, and, therefore, the machine tool cuts a line in such a direction that the tangent of the angle between the line and the Y axis is equal to the setting of the ratio of TVD3.

In the description above, the operation of motor FGM and the amplifier associated with valves V5 and V6 has been ignored, and we have assumed that FGM has been driven in order to generate a circle or a line.

Up to the present stage of the description, base ordinates have been set on TVD2 and TVD2A, to form either the centre of a circle or the beginning of a line. In the case of a circle, if a complete circle is required, it is simply necessary to rotate CFG1 through one revolution. If it is desired, however, to draw an arc of a circle or to draw a line from a position represented by the base ordinate to some predetermined point, it is necessary to use the circuit associated with valves V5V6 and the function generator motor.

A point representing the end of the circle or of the line is set upon TVD5 and TVD5A for the X and Y co-ordinates respectively. Switch S12 is set so as to connect to the grid of V6 that co-ordinate which is changing most rapidly in the region of the point representing the end of the cut.

Switch 9 is closed, and the TVD associated with CFG2 is set to zero. Now the circuit follows through switch 9 through winding of CFG2, which generates zero voltage through contact S9 to NTA, through TVD5. The end of TVD5 is connected with the end of TVD2 and the rest of the circuit follows as described earlier. Then, by the same reasoning, as has been used above concerning the voltage at the nulling transformer NTB, and nulling transformer NTB1, nulling transformers NTA and NTA1 generate a voltage representing the distance between the position of the machine tool cutter and a position representing the end of the cut. Considering NTA, the secondary of NTA is passed through a contact on switch 1S1, and then through a contact on S12, and thence to the input of amplifier V6, which in turn controls the speed of function generator motor FGM. The input to amplifier V6 is rectified by ordinary rectifier RECT, so that when the voltage at NTA is zero, the function generator motor stops. Thus the control has now been arranged so that an element of cut can be started by closing switch 4 and switch 9, and stopped automatically at the required point by stopping FGM.

In many cases, the end of one element of shape is the beginning of the next, so that if it were desired for instance to make another circle connected to the first circle, the end of the first cut would be represented by the beginning of the second. In this case switch S9 would be closed so as to select GFC2 for the second cut (TVD6A) (operating in conjunction with CFG2) would be set to the radius of the next circle, and TVD5 would be set to the centre of the next circle. Nulling transformer NTA would then have zero voltage at the co-ordinates representing the commencement of the second cut and function generator motor FGM would stop in the correct place.

Now, switch IS1 is thrown to the other position, and the next element of shape selected by either resetting circular function generator CFG1 for another circle or by declutching CFG1 and selecting another function generator for a line. Now, the functions of NTB and NTA are interchanged in that NTB now operates the function generator motor and NTA operates the machine tool servo.

A sequence of shapes can be made by selecting and resetting function generators and throwing switch IS1 during the interval between completing one element of shape and commencing the next.

In this part of the description, an arrangement like that of FIGURE 8 has been assumed for the function generator drives, in which the heart shaped cams always reset the function generators to a datum position when the clutches are broken. This means that with the arrangement described, all circles which are cut are commenced at the point where the X co-ordinate has a maximum value. It may, however, be desirable to commence cutting circles at some other point. To commence circles at another point in the circumference, either the heart shaped cams may be removed and the resolver set by hand to the desired angle before the commencement of a cut, or a system may be employed to provide the desired point of commencement with the resolver in a datum position. This latter system depends on moving the axis of energisation of the resolver relative to the reference position of the stator. FIGURE 6 shows a circuit which provides this feature. Settings of TVDX1 and TVDY1 in FIGURE 6 are arranged to represent the XY co-ordinates of the beginning of the cut with reference to the centre of the circle, so that both WX and WY windings on the resolver are energised, instead of one winding as shown on FIGURE 13. The precise operation of the circuit according to FIGURE 6 is fully described in British Patent No. 696,283.

There is shown in FIGURE 3 a method by which the work table analogue generator WTAG, may be adapted for measuring angular movement. In the example the contacts CW are formed on a disc 1 mounted on a shaft Z driven by a motor Y through gearing Q. The contacts CW are shaped so that the sine of the angle of movement of the resolver R is proportional to the rotation of the disc 1. The connections and resolver arrangement are the same as already described and have been given the same reference letters.

Such an arrangement produces an analogue of angular positions.

The abutments RC or CW, whilst being preferably equispaced, may alternatively be spaced unequally provided that a transition between one resolver contact and its neighbour can be carried out without breaking contact, or undesirable overlap. Likewise the contacts $R_1$ to $R_4$ may be distorted in spacing provided that the above given conditions are met.

Errors in the work table analogue generator or the work rotating analogue generator may be compensated by the well known cam correction methods, conveniently by driving a potentiometer from the cam, such potentiometer being fed from a constant voltage supply, and whose slider voltage is connected additively to the output of the work table analogue generator or work table rotary analogue generator.

In order to avoid small errors which may arise during the transition of the contact from one of rollers $R_1$, $R_2$, $R_3$, $R_4$ to another, two systems as described may be employed in a manner shown on FIGURES 1B and 1C. Both resolver winding starpoints connected to R$a$ and R$ac$ respectively are at the same potential and a switch Sw1 is mounted on the table and operated by cams or abutments SBC on a slidebar SB fixed on the bed so that the connection is moved from a resolver about to undergo transition to another which is not yet about to undergo transition. The switch Sw1 is preferably of a make-before-break type. The respective rows of abutments SBC are, of course, staggered so that both resolvers are not in transition at the same time. For applications requiring less precision, or involving a relatively small total travel of the work table, two resolvers may be used in this manner but provided with only one roller each, two spaced abutments, one for each, and a toroidal voltage divider winding energising the abutments as above described.

I claim:

1. A machine tool control system applied to a machine having a tool and a worktable movable relatively to the tool in at least two ordinal directions, the system including means providing positional voltages indicative of relative positions of the tool and the worktable in the said directions, a first set of electrical function generators and of variable base ordinate voltages setting means, a second set of electrical function generators and of variable base ordinate voltages setting means, first electric motor means arranged to drive a selected function generator, each set being adapted for the production of ordinal command voltages built up from base ordinate voltages indicative of the starting point of a shaped element of a contour on a workpiece attached to the worktable and, when a function generator of the set is driven by the first motor means, from progressively varying supplementary ordinal voltages which, when added to the base ordinal voltages, define the shaped element of the contour, second motor means arranged to effect relative movement between the tool and the worktable in each of the ordinal directions, first electrical summing means adapted to sum the positional voltages and the command voltages from the first set and second electrical summing means adapted to sum the positional voltages and the command voltages from the second set, and switch means arranged in one setting to apply the output from the first summing means to the second motor means which position the worktable and the output from the second summing means to the first motor means driving the selected function generator, and in a second setting to apply the output from the first summing means to the first motor means and the output from the second summing means to the second motor means, whereby in use either set can provide base ordinal voltages defining the starting point of a shaped element of the contour and, upon one of its function generators being driven by the first electric motor means, through the associated summing means operate the second motor means to cause appropriate relative movement between the worktable and the tool, while the other set can at the same time provide base ordinal voltages defining the starting point of the next shaped element of the contour and thus the end point of the element being worked upon, and through the associated summing means cause the first motor means to drive the said function generator of the other set until, upon balancing of the positional voltages and the command voltages, it causes stoppage of the second motor means when the tool and worktable have the relative positions defined by the base ordinal voltages corresponding to the end point of the element being worked upon.

2. A machine tool control system according to claim 1, in which in each set toroidal voltage dividers provide the base ordinal voltages, and a reference supply is arranged to feed the said toroidal dividers, each toroidal voltage divider being adjustable to change the value of its output and thus the value of the base ordinate voltage setting.

3. A machine tool control system according to claim 1, in which the function generators include a resolver having an input shaft and acting as a function generator for circles, a reference supply is arranged to feed the resolver, and the first motor means are arranged for coupling to the input shaft.

4. A machine tool control system according to claim 1, in which the function generators include a straight line function generator, this generator is in the form of a continuously variable transformer having an input shaft, a toroidal voltage divider is arranged to be supplied by the transformer, a reference supply is arranged to feed the transformer, and the first motor means are arranged for coupling to the input shaft.

5. A machine tool control system according to claim 1 in which a stylus capable of being traced over a master pattern comprises the function generator means whereby electrical analogues of the co-ordinate movements of said stylus may be produced, toroidal voltage dividers being connected to said analogues, said toroidal voltage dividers outputs are the outputs of the function generator and said toroidal voltage dividers being set to a ratio representing a desired change of scale between said stylus and the ordinate movement of the work piece.

6. A machine tool control system having a first set and a second set of function generators and base ordinate settings, electrical outputs from the first set of said function generators and said base ordinate settings additively connected through means forming an electric analogue of the co-ordinate movements required to produce a first element of shape on a work piece, electrical outputs of the second set of said function generators and base ordinates likewise additively connected through second means forming an electrical analogue of the next succeeding element of shape required on the work piece, an input shaft of a function generator of said set rotated at a speed dependent upon the relationship between the selected co-ordinate positions of the selected electrical outputs of said first and a function generator of said second set, whereby the function generator of said first set forms a command for controlling machine tool movements whereby work table movements will cease on reaching a desired position on said work piece, third means being provided for transferring the command to a function generator of said second set, a control drive rotating the function generator of said first set disconnected and coupled to the function generator of said second set, fourth means resetting the same or another function generator of said first set for the next succeeding element of shape toroidal voltage dividers provide said base ordinate analogues a reference supply feeding said toroidal voltage dividers, said reference supply adjusted to have a ratio proportional to the value of the base ordinate setting said output voltages of base ordinate toroidal voltage divider function generator outputs and reset voltages are additively connected to form two error voltages, one representing the difference between a command voltage for a desired element of shape and a reset voltage, and the other the difference between the reset voltage and a command voltage representing the commencement of the next succeeding element of shape.

7. A machine tool control system according to claim 1 having a system for controlling the function generator motor speed said system responsive to a first error voltage, a system for controlling the lead screw motor speed, said system responsive to a second voltage, a changeover switch to interchange the first and second voltages when a given element of shape has been completed by the machine and a second element of shape about to be cut.

8. A machine tool control system according to claim 1 wherein said base ordinate settings are obtained from a toroidal voltage divider, an alternating reference voltage supplied to said toroidal voltage divider and forming part of a work table analogue generator.

9. A machine tool control system according to claim 1 wherein said base ordinate settings are obtained from a toroidal voltage divider, an alternating reference voltage supplied to said toroidal voltage divider and forming part of a work table analogue generator and said commands are produced, said toroidal voltage divider connected in parallel fed partly from said work table analogue generator toroidal voltage divider and partly from a supply voltage and output from each of the parallelly connected toroidal voltage divider being fed to a nulling transformer feeding, through banks of switches, said two sets of function generators.

10. A machine tool control system according to claim 1 wherein said base ordinate settings are obtained from a toroidal voltage divider, an alternating reference voltage supplied to said toroidal voltage divider and forming part of a work table analogue generator and said commands are produced, said toroidal voltage divider connected in parallel fed partly from said work table analogue generator toroidal voltage divider and partly from a supply voltage and output from each of the parallelly connected toroidal voltage divider being fed to a nulling transformer feeding, through banks of switches, said two sets of function generators, wherein, the primary windings of each of said nulling transformers are connected to two banks of interlocked switches controlling said two sets of function generators, said secondary windings of each of said nulling transformers being earthed to the machine tool bed and connected to an interlocked switch at the other end whereby either nulling transformer can be selectively connected to a function generator servo amplifier and a servo motor lead screw controlling the machine tool.

11. A machine tool control system according to claim 1 wherein each set of said function generators is set by means of a programming tape.

12. A machine tool control system according to claim 1 wherein said function generators of each set are each selectively driven by a motor through clutches, relays controlling operations of said clutches said relays being operated by a programming tape.

13. A machine tool control system according to claim 1 having hand wheels for setting manually each set of said function generators with reference to the indications of null voltage indicators.

14. A machine tool control system according to claim 1 wherein there is provided a finding ordinate circuit to locate the end of a predetermined working tool movement, means being provided to de-energise the machine tool work table motors during the period of resetting a set of said function generators and resetting said finding ordinate circuit to represent the end of the succeeding work tool movement.

15. A machine tool control system according to claim 1, wherein said function generator of each set are each selectively driven by a motor through clutches, relays controlling operations of said clutches said relays being operated by a programming tape and vector combinations of selected outputs of at least one function generator of said first set of function generators in relation to at least one function generator of said second set of function generators are utilised to control a motor controlling said function generators.

16. A machine tool control system according to claim 1 wherein a control motor of said function generators is controlled from a fixed pre-selected voltage during the resetting of the function generators with a time delay from the fixed voltage to that set by the succeeding command voltage.

17. A machine tool control system according to claim 1 wherein there is provided a finding ordinate circuit to locate the end of a predetermined working tool movement, means being provided to de-energise the machine tool work table motors during the period of resetting a set of said function generators and resetting said finding ordinate circuit to represent the end of the succeeding work tool movement and two reset voltages proportional to the travel of the work tool in relation to two respective adjustable points, which points are adjusted to positions which correspond to said base ordinates of the element of shape being cut and the next element of shape to be cut respectively, said reset voltages when connected additively to the outputs of function generators and toroidal voltage divider settings, error voltages for controlling the function generator motor and the machine lead screw motor respectively.

18. A machine tool control system according to claim 1 wherein there is provided a finding ordinate circuit to locate the end of a predetermined working tool movement, means being provided to de-energise the machine tool work table motors during the period of resetting a set of said function generators and resetting said finding ordinate circuit to rpresent the end of the succeeding work tool movement and two reset voltages whose sum is proportional to the travel of the work tool in relation to an adjustable point, which point is adjusted to a position which corresponds to said base ordinates and forming with the selected function generators the command and said finding co-ordinates respectively said auxiliary base co-ordinates being set on toroidal voltage dividers so that both error voltages are zero at the end of a cut.

19. A machine tool control system according to claim 1, a finding ordinate circuit is provided to locate the end of a predetermined working tool movement, means being provided to de-energise the machine tool work table motors during the period of resetting a set of said function generators and resetting said finding ordinate circuit to represent the end of the succeeding work tool movement, one reset voltage being arranged to be proportional to the travel of the work table in relation to an adjustable point, the finding ordinate being set to the value of the output of a selected function generator ordinate at the end of a work tool movement instead of being proportional to the value of the command voltage at the end of machine tool movement.

20. An apparatus for producing an alternating voltage proportional to the relative linear movement between a first and a second member in which one member is provided with electrically conductive abutments along the line of movement, such abutments being electrically insulated from one of said members and each other and having one face in a plane perpendicular to the direction of relative movement, and each abutment connected to taps on a voltage divider so that it carries a voltage representing to a suitable scale of volts per inch the distance along the line of movement between its reference face and a point in a reference plane perpendicular to the line of relative movement on the other member, a resolver, carrying on its rotating member at least two cylinders with axes parallel to the axis of such rotating member, means for applying torque to the resolver shaft to press the cylinders successively to successive faces of the abutments when the members are moved relative to each other, such abutments being positioned to permit of such successive contact, each roller or cylinder being electrically conductive and insulated from the others, and connected to a resolver output winding wound on an axis making angles with the other winding axes substantially equal to the angles subtended between the respective rollers and the centre of rotation, the remaining ends of said windings being joined to form a star point which carries a voltage representing, to a suitable scale, the amount of linear movement between said members.

21. Apparatus according to claim 10 wherein said resolvers are utilised, each with cylinders operating on one of two rows of abutments each of which said abutments carrying a voltage representing its distance along the line of movement from a point in a reference plane perpendicular to the line of movement, switching means being provided for switching from one resolver to the other when the resolver cylinders are in transitional contact from one abutment to the next.

22. Apparatus according to claim 20 wherein two resolvers are utilised, each with one cylinder operating on one of two rows of abutments, each of which abutments carries a voltage representing its distance along the line of movement from a point in a reference plane perpendicular to the line of movement, switching means for switching from one resolver to the next when a given resolver exceeds a given angular displacement.

23. Apparatus according to claim 20 adapted to produce an analogue of circular movements by placing abutments on a circular rotatable member to be contacted by contacts on the arms of a resolver, the abutments being electrically connected to taps on a toroidal voltage divider.

24. Apparatus according to claim 20 adapted to produce an analogue of circular movements by placing abutments on a circular rotatable member to be contacted by contacts on the arms of a resolver, the abutments being electrically connected to taps on a toroidal voltage divider the faces of the abutments shaped so that the sine of the angle of movement of the resolver shaft is proportional to the angle of movement of the rotatable member.

References Cited in the file of this patent

UNITED STATES PATENTS

| | | |
|---|---|---|
| 2,492,731 | Branson | Dec. 27, 1949 |
| 2,867,759 | Comstock | Jan. 6, 1959 |
| 2,894,685 | Spencer | July 14, 1959 |
| 2,922,940 | Mergler | Jan. 26, 1960 |